Dec. 2, 1930.          R. M. WOYTYCH          1,783,596
WORKHOLDER

Filed Jan. 16, 1925

Inventor:
Raymond M. Woytych.
By Lindall Parker & Carlson
Attys

Patented Dec. 2, 1930

1,783,596

UNITED STATES PATENT OFFICE

RAYMOND M. WOYTYCH, OF FOND DU LAC, WISCONSIN, ASSIGNOR, BY MESNE ASSIGNMENTS, TO THE HEALD MACHINE COMPANY, OF WORCESTER, MASSACHUSETTS, A CORPORATION OF MASSACHUSETTS

WORK HOLDER

Application filed January 16, 1925. Serial No. 2,756.

The present invention relates to improvements in workholders for machine tools, and has particular reference to portable shuttles adapted to have one or more work blanks centered and clamped therein, and to be centrally mounted in a machine chuck.

The primary object of the invention is to provide a novel shuttle for ratchet wheels and similarly shaped work blanks.

In ratchet wheels, the bore through the hub must be ground or machined true with respect to the teeth. The teeth, however, render it difficult to center and clamp the ratchet wheels in workholding shuttles. A specific object of the invention therefore resides in the provision of new and improved means for centering and clamping work blanks of the above character.

Further objects and advantages will become apparent as the description proceeds.

Figure 1:
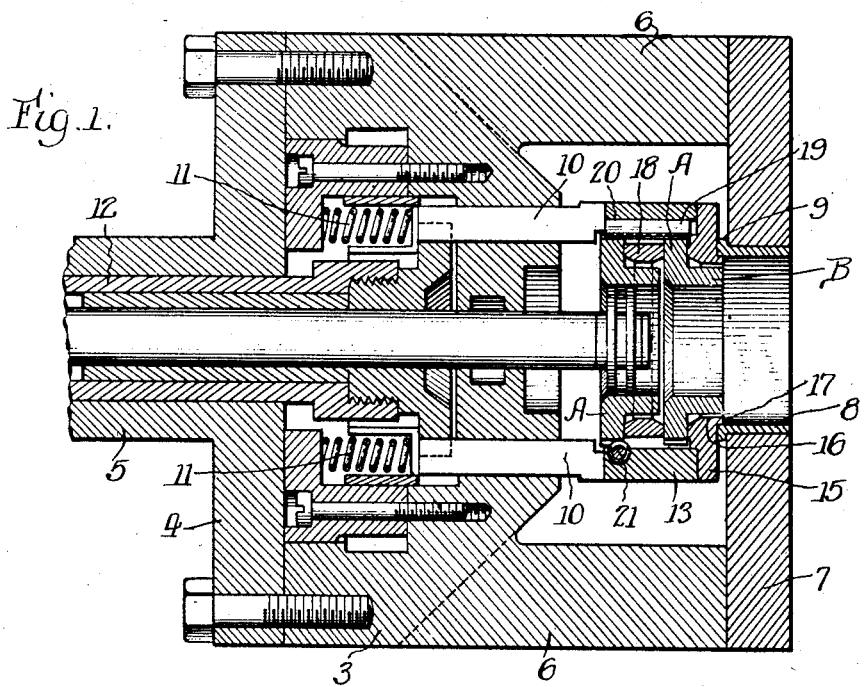

In the accompanying drawings, Figure 1 is a sectional view of a chuck in which a shuttle embodying the features of my invention is mounted.

Figure 2:
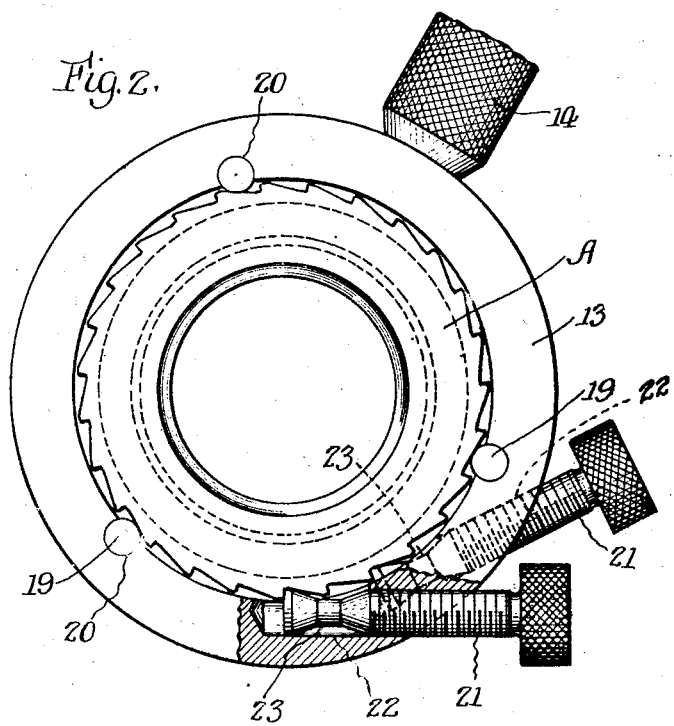

Fig. 2 is a side elevation of the shuttle with parts broken away to show one of the adjusting screws for moving the ratchet wheels into operative engagement with the clamping means.

While the invention is susceptible of various modifications and alternative constructions, I have shown in the drawings and will herein describe in detail the preferred embodiment, but it is to be understood that I do not thereby intend to limit the invention to the particular form disclosed, but aim to cover all modifications and alternative constructions falling within the spirit and scope of the invention as expressed in the appended claims.

In its exemplary embodiment, the invention contemplates the provision of a chuck of suitable construction such as the one shown in Figure 1 in which the shuttle is adapted to be mounted. The chuck comprises a body 3 which is securely attached to a disk 4 on the forward end of a rotatable spindle 5, and which is formed with a pair of diametrically opposed and forwardly extending arms 6. The latter are bridged at their forward ends by a front plate 7 which is provided with a central bushing 8 having a flange 9 on its inner edge and being concentric about the axis of rotation.

Slidably mounted in the body for reciprocatory movement toward and from the bushing 8 are a plurality of spaced clamping members 10. These members are pressed forwardly by a plurality of coiled springs 11, and are adapted to be retracted by a draw rod 12 extending through the spindle 5.

The shuttle mounted in the chuck comprises a body 13 which preferably is cylindrical in form and which is provided with a suitable handle 14. Secured to the forward end of the body is an end plate 15 having a central opening 16 and a pilot or centering flange 17 fitting into the bushing 8 to locate the shuttle in the chuck. The rear end of the body is adapted to receive one or more ratchet wheels A, the bores of which are to be ground or machined. While the shuttle can be designed to accommodate different numbers of blanks, it is in the present instance adapted to receive one or two. The blanks A are provided with hubs B, one of which enters the hole 16 in the end plate 15 and the other of which extends into a spacer 18 between the blanks. If blanks without hubs are to be handled, the spacer 18 can be dispensed with.

A plurality of hardened pins 19, three in the present instance, are rigidly secured in holes 20 which are bored in the body 13 at spaced distances about its inner periphery and which extends longitudinally thereof. The inner sides of these holes open into the interior of the body 13 and permit the sides of the pins 19 to project therefrom into engagement with the backs of the ratchet teeth.

To clamp the ratchet wheels A in position, a pair of adjusting screws 21 are threaded through two bores 22 drilled in opposite ends of the body 13. Each bore is suitably inclined with respect to the body 13 and opens along its inner end into the interior of said body to permit the inner end of the associated screw to engage the perpendicular face of one of the ratchet teeth. To provide clearance for the succeeding ratchet tooth, the inner end of the screw 21 is formed with an annular peripheral notch 23.

In loading the shuttle, the blanks A are positioned in the body 13 with each of the pins 20 loosely disposed between adjacent teeth. The screws 21 are then adjusted to rotate the blanks A in the body, thereby causing the backs of the teeth to ride on the pins 20 into clamping engagement therewith. The pins 20 thus serve to center and clamp the blanks A. It will be evident that one shuttle can be unloaded and reloaded while the other is in the machine, and that the blanks in each shuttle can be centered and clamped quickly and precisely without the exercise of skill or care.

I claim as my invention:

1. In apparatus of the class described, in combination, a body adapted to receive a ratchet wheel, a front plate closing one end of said body, said plate having a central opening and a centering pilot concentric with said opening, a plurality of pins rigidly secured in the inner periphery of said body and extending longitudinally thereof, said pins being adapted to fit over certain of the ratchet teeth, and means for rotating said wheel to move the backs of said teeth into clamping engagement with the said pins.

2. In apparatus of the class described, in combination, a body adapted to receive a ratchet wheel, a plurality of clamping pins rigidly secured in the inner periphery of said body and adapted to loosely engage the backs of certain of the ratchet teeth, and an adjusting screw rotatably threaded in said body and adapted to engage the face of one of the ratchet teeth, said screw serving as a means for rotating said ratchet wheel to move said backs of said teeth into clamping engagement with said pins.

3. In apparatus of the class described, in combination, a body adapted to receive a ratchet wheel, said body having an internal surface of revolution, a plurality of inward projections breaking said surface, said projections being located in a stationary position with respect to said body and constituting clamping means, an abutment provided by said body adapted to engage the radial wall of a tooth of said ratchet wheel, and screw means to move said abutment, whereby to clamp said ratchet wheel in wedging engagement with said projections.

4. In apparatus of the class described, in combination, an annular work holding body adapted to receive a blank having a plurality of inclined surfaces in its periphery, an annular end plate fastened to said body, a flange provided on said end plate, said flange being concentric to the axis of said annular body, whereby the whole may be concentrically located in a chuck, a plurality of clamping means mounted in said annular body at spaced points about its inner periphery and concentric with said flange, and means for partially rotating a work blank in said body to effect a wedging engagement between said work blank and said clamping means to center and clamp said blank in said body.

In testimony whereof, I have hereunto affixed my signature.

RAYMOND M. WOYTYCH.